US008181665B2

(12) United States Patent
Pearl II et al.

(10) Patent No.: US 8,181,665 B2
(45) Date of Patent: May 22, 2012

(54) FLUSHING UNIT AND FLUSHING SYSTEM FOR FLUSHING VAPOR COMPRESSION SYSTEMS

(75) Inventors: David S. Pearl II, Fort Lauderdale, FL (US); Dragan Bukur, Fort Lauderdale, FL (US)

(73) Assignee: Uniweld Products, Inc., Fort Lauderdale, FL (US)

( * ) Notice: Subject to any disclaimer, the term of this patent is extended or adjusted under 35 U.S.C. 154(b) by 526 days.

(21) Appl. No.: 12/387,848

(22) Filed: May 8, 2009

(65) Prior Publication Data

US 2010/0282336 A1 Nov. 11, 2010

(51) Int. Cl.
*F16K 17/04* (2006.01)
*B08B 9/02* (2006.01)

(52) U.S. Cl. .................... 137/240; 137/115.01; 137/588

(58) Field of Classification Search .................. 137/238, 137/240, 268, 115.01, 587, 588
See application file for complete search history.

(56) References Cited

U.S. PATENT DOCUMENTS 2,639,908 A 5/1953 Graham .......................... 261/50
3,524,465 A * 8/1970 Sadler .......................... 137/268
4,957,133 A 9/1990 Linz et al. ..................... 137/240
6,036,054 A * 3/2000 Grill ................................ 222/3
6,155,066 A 12/2000 Chandler et al. ................ 62/292
6,196,016 B1 3/2001 Knowles et al. ................ 62/292
6,708,717 B1 3/2004 Coogle ......................... 137/240
2006/0179852 A1 8/2006 Thomas et al. ................... 62/85

OTHER PUBLICATIONS

DiversiTech Corp.: Flushing solvent Kit; Mar. 2, 2009 with Technical Data Sheet (2-Pages).
Atlantic Chemical & Equipment Co.; Ace Power Flush Kit, 2007 (1 page).

* cited by examiner

*Primary Examiner* — Kevin Lee
(74) *Attorney, Agent, or Firm* — Nields, Lemack & Frame, LLC

(57) ABSTRACT

A flushing unit for flushing vapor compressions systems with a flushing agent. The flushing unit includes a pressure relief member to ensure that the reservoir containing the flushing agent is not over-pressurized. In certain embodiments, the flushing unit is adapted to be in communication with a driving fluid or propellant, such as an inert gas or a flushing gas, and with a source of a flushing agent, such as a reservoir. The flushing unit includes a valve that, when opened, causes the driving fluid to flow into the reservoir containing the flushing agent and displace the flushing agent from the reservoir, causing it to ultimately flow into the system being flushed such as via a suitable hand-held injector. In the event the pressure in the reservoir exceeds a predetermined level, a pressure relief valve in the flushing unit is automatically actuated, thereby relieving pressure in the otherwise closed system.

7 Claims, 5 Drawing Sheets

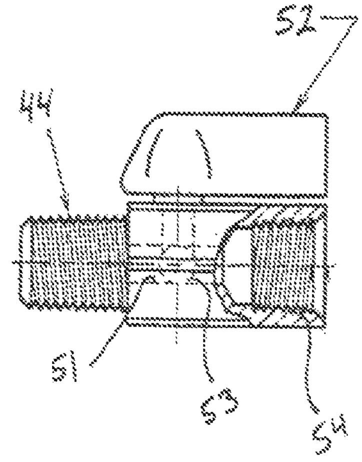
FIG. 9
FIG. 10
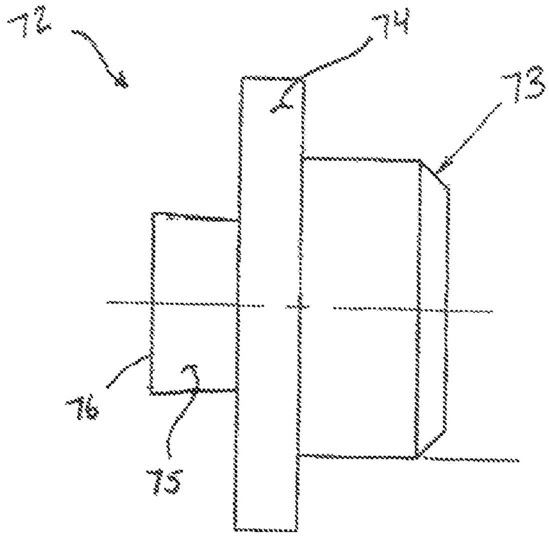

FLUSHING UNIT AND FLUSHING SYSTEM FOR FLUSHING VAPOR COMPRESSION SYSTEMS

BACKGROUND

The present disclosure relates to a flushing unit, and more particularly, to a flushing unit cap assembly particularly suited for flushing vapor compression systems, such as HVAC and refrigeration systems.

Air conditioning and other systems require periodic flushing of refrigerants and/or contaminants such as during retrofits, refrigerant conversions and compressor burnouts, as well as for periodic maintenance. Non-flammable flushing solvents are typically used, that are generally compatible with CFC and HFC refrigerants and compressor oils. Such solvents must comply with stringent EPA Significant New Alternatives (SNAP) standards, and are capable of removing particulates, sludge, residue oil, moisture and acid from line sets and other system components.

For example, replacement of an air conditioner or heat pump and the concominant upgrade from R-22 to R-410A refrigerant can cause compatibility problems, as the mineral oil used in R-22 systems is not compatible with the R-410A refrigerant and oil. R-22 is a hydrochlorofluorocarbon (HCFC), and the presence of chlorine results in the HCFC having an affinity for mineral oil. In contrast, R-410A is a hydrofluorocarbon (HFC) and has no affinity for mineral oil. Any mineral oil remaining in the system tends to hang up in the refrigerant lines and other system components. This reduces efficiency and can cause unwanted chemical reactions with R-410A refrigerant. It is also important to rid the system of moisture, since moisture can break down the synthetic oil used with R-410A and minimize or eliminate its lubrication properties, causing the compressor to fail.

Accordingly, systems have been developed that allow for the quick and easy flushing of HVAC and refrigeration system line sets and system components with flushing agents under pressure. However, safety concerns arise, as the cylinder containing the flushing agent can be inadvertently over-pressurized. This can result in explosion, causing personal and/or property damage.

SUMMARY

The problems of the prior art have been overcome by the assembly and apparatus set forth herein. In certain embodiments, a flushing unit includes a pressure relief member to ensure that the reservoir containing the flushing agent is not over-pressurized. In certain embodiments, the flushing unit is adapted to be in communication with a driving fluid or propellant, such as an inert gas or a flushing gas, and with a source of a flushing agent, such as a reservoir, which can be a refillable cylinder. The flushing unit includes a valve that, when opened, causes the driving fluid to flow into the reservoir containing the flushing agent and displace the flushing agent from the reservoir, causing it to ultimately flow into the system being flushed such as via a suitable hand-held injector. In the event the pressure in the reservoir exceeds a predetermined level, a pressure relief valve in the flushing unit is automatically actuated, thereby relieving pressure in the otherwise closed system. The flushing unit can be used with compression systems including but not limited to evaporators, condensers and line sets.

BRIEF DESCRIPTION OF THE DRAWINGS

FIG. 9 is a side view, partially in section, of a ball valve for a flushing unit in accordance with certain embodiments; and FIG. 10 is a side view of a biasing member seat holder in accordance with certain embodiments.

DETAILED DESCRIPTION

Suitable flushing agents are not particularly limited, and include commercially available solvents in which contaminants are soluble or miscible, such as terpenes, esters, polyalkylene glycols, polyol esters, polyvinyl ethers, etc. The flushing agent may include one or more cleaning agents. Suitable driving fluids or propellants for forcing the flushing agent out of the reservoir and into the vapor compression system include inert gases. A preferred driving fluid is compressed nitrogen, most preferably dry nitrogen.

Figure 1:
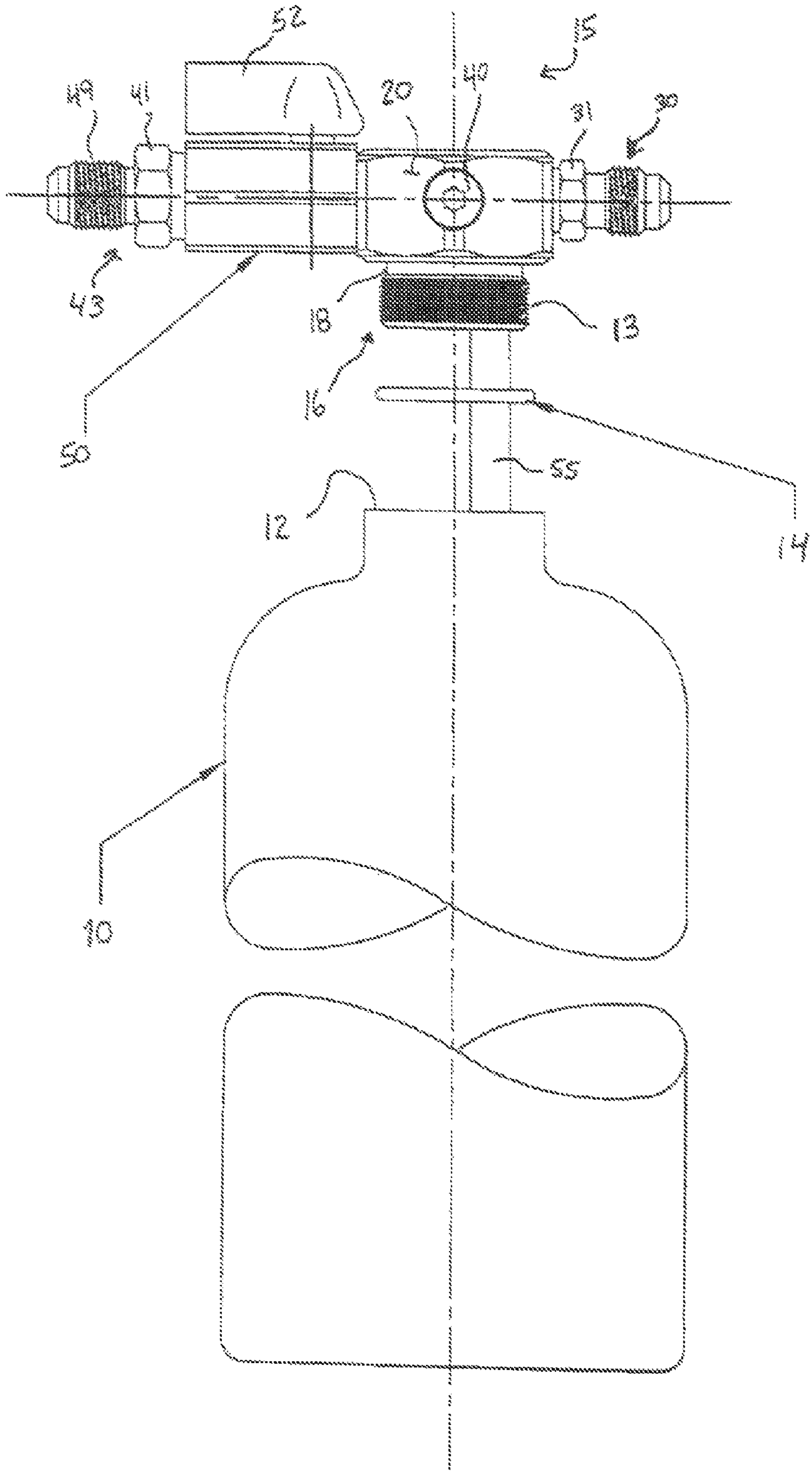
FIG. 1 is a front view of a flushing unit attached to a flushing agent cylinder in accordance with certain embodiments.

Turning to the drawings, where like numerals indicate like elements, FIG. 1 shows a flushing agent reservoir 10, which in the embodiment shown is an aluminum cylinder. The reservoir 10 can be refillable, such as via an inlet in the reservoir 10, or can be a single use reservoir that is disposed of when emptied. The reservoir 10 includes an opening 12, providing access to the interior of the reservoir. In the embodiment illustrated, the opening 12 has internal threads (not shown), which can mate in sealing relationship with corresponding external threads 13 on connecting member 16 of the cap 20 of flush unit 15. An O-ring 14 can be carried in the annular groove 18 of connecting member 16 to ensure an effective seal between the cap 20 of the flush unit 15 and the reservoir 10. Those skilled in the art will appreciate that other means of sealingly attaching the flush unit 15 to the reservoir 10 can be used, and that the threaded connection illustrated is merely exemplary.

Figure 4:
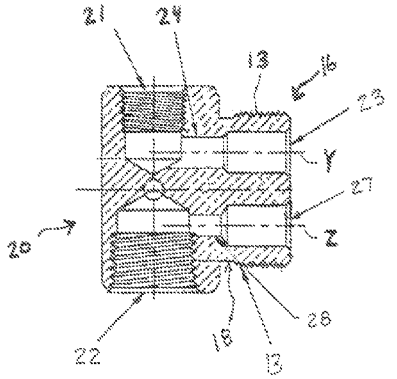
FIG. 4 is a side cross-sectional view of a cap for a flushing unit in accordance with certain embodiments.
Figure 6:
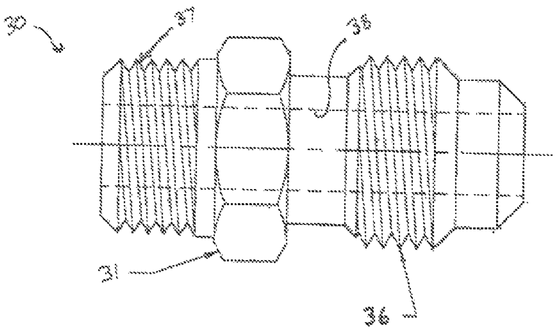
FIG. 6 is a side view of a hose connection for a flushing unit in accordance with certain embodiments.

Turning now to FIG. 4, there is shown an embodiment of the cap 20. In the embodiment shown, cap 20 includes a first radial bore 21 and a second opposing radial bore 22. Preferably each radial bore 21, 22 is internally threaded, as shown. Bore 21 has an internal diameter configured to receive externally threaded hose connector 30 (FIG. 6). Radial bore 21 is in fluid connection with axial bore 23 via axial passageway 24. Passageway 24 preferably has an internal diameter slightly smaller than the internal diameter of axial bore 23. Radial bore 22 has an internal diameter configured to receive externally threaded member 44 of ball valve 50 (FIG. 9). Radial bore 22 is in fluid communication with axial bore 27 via axial passageway 28. Passageway 28 preferably has an internal diameter slightly smaller than the internal diameter of axial bore 27.

Figure 5:
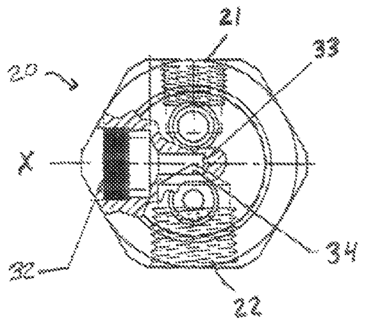
FIG. 5 is a top view, partially in section, of a cap for a flushing unit in accordance with certain embodiments.

FIG. 5 illustrates a third radial bore 32 in cap 20 having a longitudinal axis X that is perpendicular to the plane defined by the longitudinal axes Y and Z of axial bores 23, 27 and is also perpendicular to the coaxial longitudinal axes of radial bores 21 and 22. The radial bore 32 is preferably internally threaded and configured to receive pressure relief valve 35 (FIG. 3) described in further detail below. The bore 32 tapers radially inwardly to narrow passageway 33, which extends between radial bores 21, 22 and has an inlet in fluid communication with radial bore 22 at 34.

Figure 2:
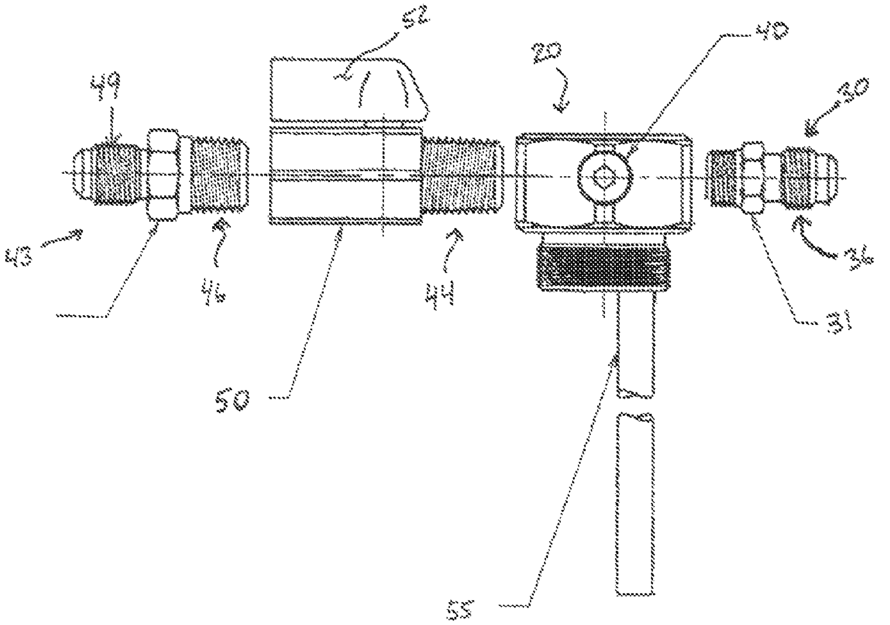
FIG. 2 is a front view of a flushing unit shown with a dip tube attached in accordance with certain embodiments.
Figure 6A:
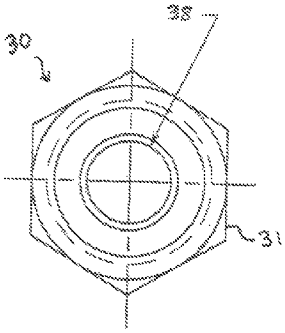
FIG. 6A is a front view of the hose connection of FIG. 6 in accordance with certain embodiments.

Turning to FIGS. 2, 6 and 6A, hose connector 30 is shown. Connector 30 includes a hexagonal flare 31 for facilitating attachment of the connector to the radial bore 21 by rotation, such as with the aid of a wrench. Extending from the flare 31 is an externally threaded member 36 configured to receive a hose (not shown) that is in fluid communication with a dispensing or injecting device such as a blow gun (not shown). Also extending from the flare 31 coaxially with member 36 but in an opposite direction is an externally threaded member 37 configured to be received by radial bore 21 in cap 20. The hose connector 30 has a central passageway 38 (FIGS. 6 and 6A) providing fluid communication between the connected hose and the radial bore 21 in cap 20.

Figure 7:
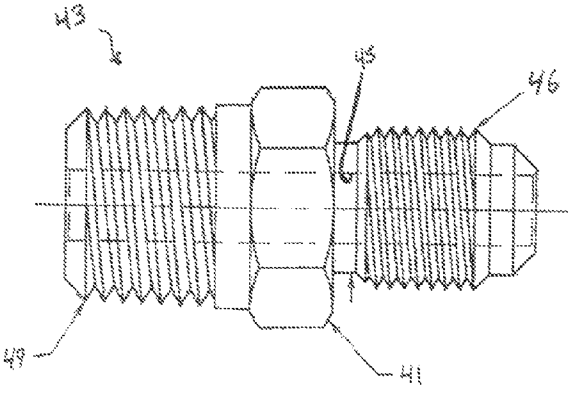
FIG. 7 is a side view of a flare connector for a flushing unit in accordance with certain embodiments.
Figure 7A:
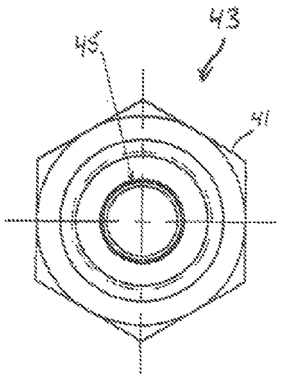
FIG. 7A is a front view of the flare connector of FIG. 7 in accordance with certain embodiments.

Ball valve 50 connects to cap 20 via externally threaded member 44, which threads into radial bore 22 such as by rotation. As partially shown in phantom in FIG. 9, ball valve 50 has a longitudinal passageway 51, preferably centrally located, that can be opened or closed by actuation of lever 52, causing semi-spherical member 53 to enter the passageway 51, thereby allowing or blocking fluid flow through the passageway 51. Those skilled in the art will appreciate that although a ball valve is shown, other valve types allowing selective fluid communication therethrough are within the scope of this disclosure. The longitudinal passageway 51 expands to an internally threaded inlet 54 that is configured to receive externally threaded member 46 of flare connector 43 (FIGS. 7 and 7A). Opposite coaxial externally threaded member 46 is a larger diameter externally threaded member 49, which is configured to be in fluid communication with a source of flushing fluid such as nitrogen via suitable hosing, for example. The flare connector 43 includes a longitudinal passageway 45, shown in phantom in FIG. 7, allowing fluid flow therethrough.

As best seen in FIGS. 1 and 2, a dip stick 55 is coupled to axial bore 23 of cap 20, such as by press fitting. The dip stick 55 is a generally cylindrical elongated hollow tube. The length of the dip stick 55 should be sufficient to extend into reservoir 10 and be immersed in the fluid contained therein when in the assembled state, providing fluid communication between the interior volume of reservoir 10 and hose connector 30 via axial passageway 24 and radial bore 21.

Figure 3:
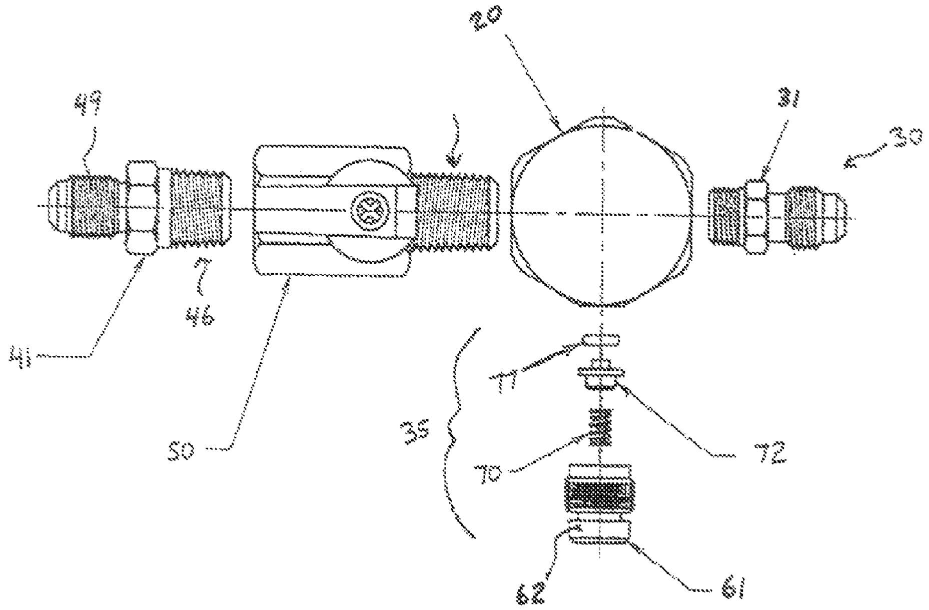
FIG. 3 is a top view, partially exploded, of a flushing unit in accordance with certain embodiments.
Figure 8:
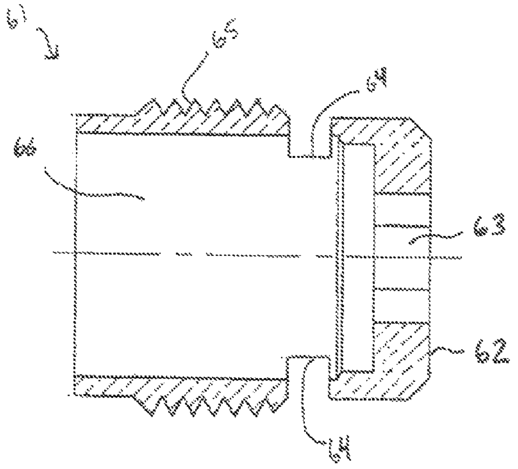
FIG. 8 is a cross-sectional view of a safety valve cap for a flushing unit in accordance with certain embodiments.

FIG. 3 illustrates the pressure relief valve assembly 35 in accordance with certain embodiments. The assembly 35 includes a generally cylindrical relief cap 61, also shown in FIG. 8. Relief cap 61 has a generally hollow interior 66, and includes a head 62 having an aperture 63 that is preferably hexagonal so as to receive an Allen wrench for facilitating rotation thereof to secure the relief cap 61 in the axial bore 32 of cap 20. The relief cap 61 also includes one or more ports 64 positioned on the side wall of the relief cap 61. Preferably two diametrically opposed ports are present and are positioned so that when the relief cap 61 is coupled to the cap 20, at least a portion of a port 64 is open to ambient. The port or ports 64 extend radially inwardly of externally threaded portion 65 as shown, and allow fluid communication between radial bore 22 and the ambient, via radial passageway 33 and radial bore 22 (FIG. 5). The externally threaded portion 65 of relief cap 61 is configured to mate with the internal threads of radial bore 32 in cap 20.

Relief valve assembly 35 also includes biasing member 70, which is preferably a compression spring that is positioned during operation in the generally hollow interior 66 of the relief cap 60. The biasing member 70 seats on seat holder 72, best seen in FIG. 10. The seat holder 72 includes a generally cylindrical portion 73, preferably chamfered at its top, that has an outer diameter slightly smaller than an inner diameter of the biasing member 70. An annular flange 74 extends radially outwardly from the base of the portion 73, and preferably has a diameter substantially the same as the outer diameter of the biasing member 70. Accordingly, the biasing member is supported on the flange 74, with the portion 73 extending into the interior of the biasing member 70 when in the assembled condition. Extending axially from the flange 74 is a tapered portion 75. Portion 75 tapers radially outwardly towards its free end 76 a distance sufficient to carry sealing member 77, which is preferably an O-ring.

When the relief valve assembly 35 is in its assembled condition in cap 20, in its normal (closed) state biasing member 70 forces seat holder 72 (and sealing member 77) against the opening between axial passageway 33 and axial bore 32, blocking flow out of the passageway 33. However, if the pressure in radial bore 22 is sufficient to overcome the force of the biasing member 70, that pressure forces the seat holder 72 radially outwardly, thereby opening the pressure relief valve and allowing fluid communication between the axial passageway 33, the axial bore 32, and out the one or more ports 64 in relief cap 61 to ambient. As a result, the reservoir 10 is protected from over-pressurization. Those skilled in the art will appreciate that the biasing member 70 is thus selected to have a spring constant such that over-pressurization is prevented. A suitable spring constant is one where a pressure of about 200-210 psi is sufficient to overcome the bias of the biasing member 70.

In operation, a suitable driving fluid or propellant such as nitrogen is placed in fluid communication with the flush unit 15 such as with suitable refrigeration hosing connecting to the inlet side (flare connector 43) of the ball valve 50. The driving fluid is generally provided in a pressure regulated compressed gas cylinder having a valve. The cap 20 of the flush unit 15 is coupled to the flushing agent reservoir containing flushing agent, with dip stick 55 extending into the interior of the reservoir a sufficient distance so that it's open end is immersed in the flushing agent. The hose connector 30 is coupled to suitable hosing, which feeds an injector such as a blow gun or the like configured to introduce flushing agent into the compression system to be flushed. The pressure regulator on the driving fluid cylinder is set to a suitable pressure, such as 50-60 psi, and the ball valve 50 is opened slowly to pressurize the reservoir 10. Driving fluid thus flows through the ball valve 50 into cap 20 via radial bore 22, and into the reservoir via axial passageway 28 and axial bore 27. Once the reservoir 10 is properly pressurized, the ball valve 50 (and the valve on the driving fluid compressed cylinder) can be closed and the driving fluid connection can be disconnected from the ball valve inlet. The reservoir 10 is now pressurized for use.

In the event too much pressure (e.g., exceeding about 200-210 psi) is provided to the assembly, the excess pressure biases against biasing member 70 in the pressure relief assembly 35, forcing the seat holder 72 radially outwardly and thereby relieving pressure through the ports 64 in the valve cap 61.

What is claimed is:

1. A flushing unit for flushing a compression system, comprising a cap having a first bore configured to be in fluid communication with (i) a pressurized driving fluid, (ii) a flushing agent reservoir, and (iii) the ambient; a second bore configured to be in fluid communication with said flushing agent and a flushing agent dispenser; and a pressure relief valve comprising a biasing member for normally blocking fluid flow from said first bore to ambient; wherein when the pressure in said first bore exceeds a predetermined level, the force of said biasing member is overcome thereby allowing fluid flow from said first bore to ambient.

2. The flushing unit of claim 1, wherein said pressure relief valve further comprises a seat holder supporting said biasing member, said seat holder normally blocking fluid flow from said first bore to ambient as a result of the bias from said biasing member.

3. The flushing unit of claim 1, wherein said pressure relief valve further comprises a relief cap having side wall and at least one port said side wall.

4. The flushing unit of claim 1, wherein said driving fluid comprises nitrogen.

5. An assembly for flushing a compression system, comprising a compressed driving fluid source; a reservoir containing flushing agent; and flushing unit comprising:

a valve providing selective fluid communication between said compressed driving fluid source and said reservoir;

a cap coupled to said valve and to said reservoir, said cap comprising a pressure relief valve having a normally closed position blocking flow from said compressed driving fluid source to ambient, and an open position allowing flow from said compressed driving fluid source to ambient when a predetermined pressure within said reservoir is exceeded.

6. The assembly of claim 5, wherein said pressure relief valve comprises a seat holder supporting a biasing member, said seat holder normally blocking fluid flow from said reservoir to ambient as a result of the bias from said biasing member.

7. The assembly of claim 6, wherein said pressure relief valve further comprises a relief cap having a side wall and at least one port in said side wall.

* * * * *